United States Patent Office 3,777,012
Patented Dec. 4, 1973

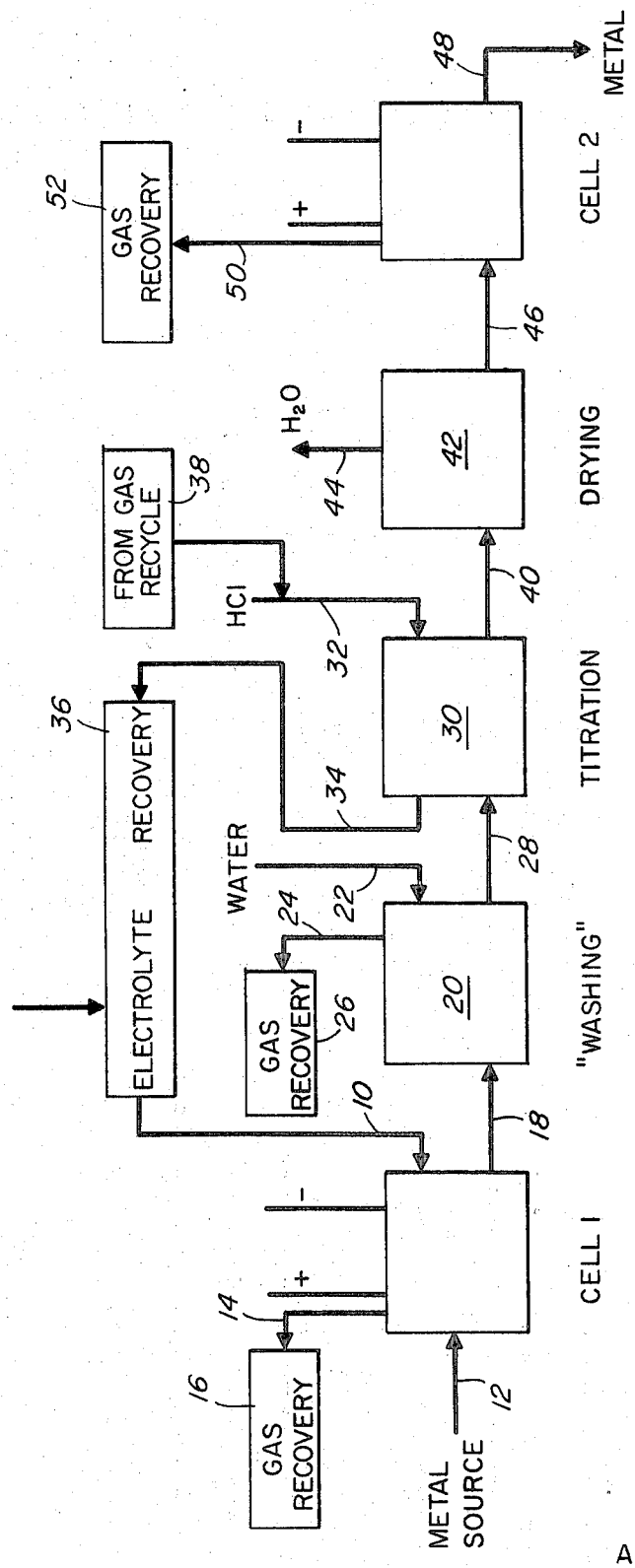

3,777,012
PROCESS FOR EXTRACTING METAL FROM METAL PLATING, SCRAP OR ORE IN A FUSED ELECTROLYTE CELL
Alberto E. Veloso, Quezon City, Philippines, assignor to Internationale Erfinder -und Patentanstalt, Vaduz, Liechtenstein
Filed Oct. 2, 1970, Ser. No. 77,536
Int. Cl. C01g 1/04; C23b 5/00, 5/32
U.S. Cl. 423—610
5 Claims

ABSTRACT OF THE DISCLOSURE

A method of recovering metal from sources such as metal plating, scrap or ore, for example tin from tin plate or tin cans, including extracting the metal in an electrolytic cell, containing sodium chloride, and forming a solution of the metal hydroxide. The metal may then be recovered in the purified metal oxide. The extraction step is performed in a fused electrolyte cell at high temperature, whereby a temporary alloy of the metal with sodium is formed, which is then washed with water and titrated to form the metal hydroxide. The metal hydroxide is then dried and calcined to form the oxide of the metal, which can be recovered in a second fused electrolyte cell in purified form, containing molten alkali metal or alkaline earth halides and the metal fluoride, or by any suitable conventional method of reducing metal oxides to pure metal.

BACKGROUND OF THE NVENTION

The invention relates to the extraction, recovery and refining of metals, and in particular to a novel electrolytic process for such purposes. The process will be described particularly with respect to the recovery of tin from tin cans, although it is suitable for the recovery of other metals, such as aluminum, zinc, lead, nickel, copper and titanium, by equivalent procedures.

The present process is related to my copending application of the same title, describing particularly a process for extraction of copper, nickel and iron, Ser. No. 77,537, filed Oct. 2, 1970, and a second copending application of mine, entitled Process for Extracting Metal From Metal Plating, Scrap or Ore in an Aqueous Electrolyte Cell, Ser. No. 82,550, filed Oct. 20, 1070.

Tin has been recovered from tin-plate scrap by several different processes. Such sources of tin include clippings and other scrap from tin plating industries, or from used and recovered tin cans, or the like. The tin coating of such materials prevents their use as such for the production of iron or steel. Also, the tin itself is very valuable. Hence, the removal of tin from the above sources of tin-plate is a desirable objective.

Tin may be recovered by a process called alkaline electrolytic detinning, a method including electrolyzing the tin-plate at the anode in a bath of causitc soda and recovering spongy metallic tin at the cathode. Detinning has also been accomplished commercially by the alkali chemical process, where tin is dissolved in heated alkaline caustic solution to form sodium stannate which is converted to tin oxide with sodium bicarbonate. Another process is the chlorine process, in which the detinning is accomplished by contact with chlorine gas, and tin is recovered as tin tetrachloride.

BRIEF DESCRIPTION OF THE INVENTION

The present process involves a method for extracting metal from scrap metal, plate or ores, and a method of refining the extracted metal in order to obtain the purified metal. In particular, the method is suitable for recovering tin from tin plate, scrap or tin cans, lead and zinc from galvanized materials, and aluminum from aluminum scrap or ores. In addition, by analogous procedures the method may be used to extract metallic titanium from scraps or ores.

In the extraction step a fused electrolyte material essentially comprising sodium chloride is used, preferably in combination with sodium carbonate, or other alkali metal halides, peroxides or hydroxides. The metal is extracted electrothermically in a fused salt electrolytic cell by combining with sodium to form a temporary sodium-metal alloy. The resulting alloy is next combined with water to form a double sodium salt with the metal, and neutralized to form the metal hydroxide in solution.

The metal hydroxide precipitates from solution and may be recovered and calcined to obtain the purified metal oxide. If desired, the metal oxide may be treated to obtain the purified metal by conventional methods. It is preferred, however, to recover the metal from the oxide electrothermically by a procedure similar to the electrothermic extraction step. In such a step the metal oxide is charged to fused electrolyte cell containing a mixture of fused salts, including the fluoride salt of the metal, and at least one alkali metal halide and one alkaline earth halide, preferably the fluorides. The purified metal is collected at the cathode of the electrolytic cell.

BRIEF DESCRIPTION OF THE DRAWING

The drawing is a block flow diagram showing the preferred extraction and refining steps in combination, both using a fused electrolyte cell.

DETAILED DESCRIPTION OF THE INVENTION

The present method involves extracting metal from a metal source, such as scrap metal, metal plate or ore, in an electrolytic cell using sodium chloride as an electrolyte, and forming a purified metal oxide, which can if desired be converted to the purified metal in a second electrolytic cell. In a preferred embodiment, the metal is extracted in a fused electrolyte cell in the presence of molten sodium chloride by the formation of a temporary sodium-metal alloy, which is converted to sodium chloride and the metal hydroxide by the steps of "washing" and titration; and the purified metal is obtained by calcining the metal hydroxide to form the metal oxide and charging the metal oxide to a second fused electrolyte cell, where the purified metal collects at the cathode.

The process can be better understood by reference to the attached figure, a block flow diaphragm showing an embodiment of the present method including both fused electrolyte cells. The process will be discussed first in general terms, and the details which vary somewhat depending upon the metal will be discussed below.

An electrolyte to be fused is charged into cell 1 through inlet line 10, and the cell is operated to raise the temperature of the fused electrolyte to the desired operating level. The metal source is then inserted into the electrolyte, as shown by line 12, contained in steel baskets, not shown, forming the cell anodes. The molten electrolyte comprises sodium chloride essentially, and may also comprise other alkali metal halides, carbonates, peroxides or hydroxides. Preferably the electrolyte comprises about 25–75 percent sodium chloride and 25–75 percent sodium carbonate, sodium peroxide or sodium hydroxide. As temporary, intermediate alloy with sodium, which is formed at the cell cathode. The gas products, chlorine and carbon dioxide, exit cell 1 via line 14, and are recovered in gas recovery unit 16. After the metal is substantially fully extracted from the metal source, the molten sodium-metal alloy is transferred through line 18 to "washing" tank 20.

The "washing" tank 20 contains sufficient water, supplied via line 22, to cool the molten alloy nearly to ambient temperature and to convert it to a complex compound of sodium and the metal, e.g. in the case of tin, $Na_2SnO_2$, in solution. The evolving gasses from the "washing" tank 20, principally steam and hydrogen, exit via line 24 and are collected in gas recovery chamber 26. The sodium-metal compound solution is then transferred via line 28 to titration tank 30, where the compound is neutralized, suitably with hydrochloric acid from line 32, to form sodium chloride and the metal hydroxide, which settles or precipitates to the bottom of tank 30, leaving the sodium chloride in the supernatant fluid, which is removed via line 34 to electrolyte recovery section 36. Carbonic acid may be used in part for this titration step, in which case the supernatant liquid would contain sodium carbonate, which also can be recycled to electrolyte recovery section 36. It is also desirable to use for the titration step the products of one or more of the gas recovery steps, from gas recycle chamber 38.

The metal hydroxide is removed from chamber 30 via line 40 and, desirably after filtration not shown, is transferred to drying chamber 42, where the metal hydroxide is calcined to form the oxide, giving off water via line 44.

In cell 2 there is a molten electrolyte comprising the metal fluoride, and alkali metal and alkaline earth halides, preferably the fluorides. Preferably the molten electrolyte comprises 15–30 percent metal fluoride, 45–70 percent alkali metal fluoride, and 10–30 percent alkaline earth fluoride. The metal oxide is charged into cell 2 via line 46, and the purified metal is recovered at the cathode of the cell and obtained through line 48. The gas products of the electrolytic cell, such as carbon dioxide, exit via line 50, and are recovered in unit 52.

The above described steps in general apply regardless of either the metal source available, scrap, plate or ore, or the identity of the recovered metal oxide or metal. In each specific instance, however, certain electrolytes, conditions, or procedures are preferred, as will now be discussed.

The preferred operating temperatures for the extraction cell and refining cell electrolytes are given below in Table I:

TABLE I

| Metal: | Preferred operating temperature | |
|---|---|---|
| | Cell 1— Extraction ° C. | Cell 2— Refining ° C. |
| Tin | 850–950 | 800–1,000 |
| Aluminum | 850–950 | 950–1,000 |
| Lead | 850–950 | 800–1,000 |
| Zinc | 850–950 | 800–1,000 |
| Copper | 1,690–1,800 | 1,690–1,800 |
| Titanium | 1,650–2,000 | 1,600–2,000 |

Table II summarizes the constituent ranges for the molten electrolytes employed in the extraction and refining steps of the present process for each of the metals, and gives electrolyte composition employed below in specific examples.

TABLE II

| | Tin | Lead | Zinc | Aluminum | Titanium |
|---|---|---|---|---|---|
| Preferred range: | | | | | |
| Extraction step: | | | | | |
| Sodium chloride | 25–75 | 25–75 | 25–75 | 25–75 | 40–60 |
| Sodium carbonate | 25–75 | 25–75 | 25–75 | 25–75 | |
| Sodium peroxide | | | | | 20–40 |
| Sodium hydroxide | | | | 0–30 | 10–30 |
| Refining step: | | | | | |
| Metal fluoride | 15–25 | 15–25 | 15–25 | 15–25 | 20–30 |
| Metal chloride | 0–15 | 0–15 | 0–15 | | |
| Sodium fluoride (or alkali metal halide) | 45–60 | 45–60 | 45–60 | 45–60 | 50–70 |
| Calcium fluoride (or alkaline earth halide) | 15–30 | 15–30 | 15–30 | 15–30 | 10–20 |
| Typical specific values: | | | | | |
| Extraction step: | | | | | |
| Sodium chloride | 50 | 50 | 50 | 50 | 50 |
| Sodium carbonate | 50 | 50 | 50 | 30 | |
| Sodium peroxide | | | | | 30 |
| Sodium hydroxide | | | | 20 | 20 |
| Refining step: | | | | | |
| Metal fluoride | 15 | 15 | 15 | 25 | 24 |
| Metal chloride | 15 | 15 | 15 | | |
| Sodium fluoride (or alkali metal halide) | 45 | 45 | 45 | 50 | 60 |
| Calcium fluoride (or alkaline earth halide) | 25 | 25 | 25 | 25 | 16 |

It is desirable, although not essential, to have both cells of similar construction. The cell dimensions may vary from about 4 ft. in depth, 4–10 ft. in width, and 12–48 feet in length. The shell of the cell is suitably 1.5-inch steel lined with firebrick treated with sodium silicate and other insulating materials, the inner portion of which is lined with rammed ashless carbon lining about 10–12 inches thick, which forms the electrolytic cell cathode. The anode of the extraction cell is connected to a suitable steel basket container into which the metal source is charged. In the refining cell the anodes may be individual carbon electrodes about a foot square in dimension, suspended vertically in the center of the cell.

The voltage across the electrolytic cells is between about 5.5 and 36 volts and adjustable, and the amperage rating is in the range of about 6,000–40,000, with both values adjusted depending upon the desired efficiency and production rate of the system. In the refining cell, the concentration of the metal oxide is about 3–25 percent. Carbon consumption is typically about 0.8 pound for pound of metal refined, for a theoretical efficiency of about 75–90 percent and energy consumption of about 5–10 kw. hrs. per pound of metal.

The following examples will describe specific procedures employing the present method for a variety of source metals. It is not intended that these will necessarily describe preferred or ideal embodiments, and by the following specific examples there is no intention to limit the scope of the present invention by any of the specific, nonessential details described.

Example 1.—Tin

In this embodiment tin is extracted from tin-plate scrap and tin-ores by melting the tin in the molten electrolyte of sodium chloride and sodium carbonate to form the theoretical and temporary alloy of the tin with the metallic form of sodium to facilitate the recovery of tin in a pure state, while rendering the iron residue fit for use in the manufacture of steel. This is done in the following manner:

The tin-cans are punctured through both ends and the body is cut into two and flattened. The tin-plate clippings are also cut into suitable sizes. These cut raw materials are cleaned to remove foreign matter and put into suitable steel baskets. The baskets are lowered into the molten electrolyte contained in the detinning cell pot electrolytic furnace, where the tin is removed and forms an alloy with sodium.

The cell-pot electrolytic furnace is made of a strong steel box of 1½-inches thick, with interior dimension of 12 feet long, 3 feet wide, and 3 feet deep. It is a rectangular in shape and provided with an ashless carbon lining of about 10 to 12 inches thick and heavily reenforced. The shell is lined with firebricks treated with sodium silicate and other insulation and covered with baked carbon lining made up of a mixture of tar and ashless carbon tamped and rammed to provide a basin-like cavity in the center. The same carbon lining extends along the cell sides to the top of the steel box. Above this box are heavy conductors from which are suspended carbon electrodes (graphite) fitted with adjustable clamps and pins permitting the raising and lowering of the individual carbon electrode, the size of which is about a foot square, connected to the steel basket. Several cells may be connected in series, each cell, likewise, being lined with firebricks and insulator bricks, and supported and insulated at its bottom and sides of the exterior of the cell to preserve and maintain heat.

A combination by weight of 50 percent sodium chloride and 50 percent sodium carbonate is charged into the bath and melted down by nearly shortcircuiting the electrodes to provide a molten electrolyte. When the cell pot electrolytic furnace is about three-fifths filled with its molten bath, the punctured, cut and flattened scrap tin-plate metal source in steel baskets is charged from an opening on top of one side of the cell pot, and the electrodes are raised to the operating position with the operating temperature of from 850–950° C. The voltage across the cell is maintained from 24 to 36 volts. Amperage of cell is maintained between 6000 and 8000. During operation, the tin source material within the steel basket travels from one end of the cell and reaches to the other end in about ten to fifteen minutes, and goes out of the cell to an opening at the top of the cell, where it is removed. The residue material is raised and then the detinned steel or iron is treated with rust preventing solution, packed, and shipped to steel smelters. The chlorine or other gas liberated at the anode is trapped and led to a strong iron vat coated heavily with mineral tar (when the tar is dried, the vessel is lined with bricks which were dipped into the mineral tar and provided with structural reenforcement and again heavily coated with mineral tar). It is a closed vessel. On top of the vessel there are two inlets, one for the chlorine gas and the other is for the hydrogen gas from the "washing" vat or refining cell. At the center of the top cover is an outlet for the HCl gas to pass through. This outlet is provided with condensing system to liquify the HCl gas. The lower end of the condensing system water is sprayed to convert the HCl gas into muriatic acid of about 25–35 percent HCl.

When the fused electrolyte becomes saturated with the tin-sodium alloy, the molten alloy is withdrawn by gravity flow from the cell pot electrolytic furnace through an appropriate outlet provided with stop-cock valve, and the same outlet is connected to the washing vat where the tin-sodium alloy is converted into sodium stannate, primarily $Na_2SnO_2$, although the alloy need not be in correct stoichiometric proportion. On account of the fast processing, there have to be a number of washing vats, each being about one-third filled with water On contact of the molten alloy with water, gaseous steam and hydrogen are immediately formed and allowed to escape out from the top hood of appropriate size so that no explosion caused by the overpressure of steam will happen. After the solution is cool enough, it is transferred to titration containers through a pump provided with filter.

Before the titration, the sodium stannate in aqueous solution is filtered, and after titration it is transferred to a giant size separatory tank made of acrylic plastic provided with a pump to withdraw the clear supernatant liquid, which is sodium chloride in aqueous solution. The gelatinous stannous tin, which is actually a stannous dihydroxide or stannous acid, precipitates to the bottom of the separatory tank, and is withdrawn through an appropriate outlet fitted with a stop-cock valve at the conical end of the bottom of the tank. The gelatinous tin (stannous dihydroxide) is then dehydrated over the hot second step cell-pot electrolytic furnace. On the average, a ton of the scrap tin-plate yields about 14 kilograms of tin available for recovery, and about 16.7 kilograms of the alloy, which is converted to about 23 kilograms of sodium stannate to yield about 18 kilograms of stannous dihydroxide, and about 15.8 kilograms of stannous oxide, available for feeding as a filler in the electrolyte refining cell. Also a ton of scrap raw material will require about 2.5 tons of sodium chloride and sodium carbonate combined together, much of which is recoverable after titration. The cell pot electrolytic furnace is capable of holding 20 tons of scrap tin plate in every run of about 10–15 minutes.

The refining electrolytic furnace is constructed in the same manner and of the same size, and with the same electrode arrangement as the extraction cell, without the steel baskets. The pot cell is filled with a molten electrolyte of about 45 percent by weight sodium fluoride, 25 percent calcium fluoride, 15 percent stannous fluoride and 15 percent stannous chloride. The intermediate stannous oxide is thrown on top of the bath and the electrodes are raised to the operating position, with its operating temperature at 850–950° C. The voltage across the cell is about 36 volts. Amperage of the cell is about 7,500 initially, but increases to about 15,000 after several runs. As the fillers of calcined stannous oxide are charged to the bath, there is a slight drop of the voltage, about 5 to 6½ volts. The concentration of the stannous oxide raw material is about 10–25 percent. The tin metal is formed in high purity, about 99.99 percent, at the bottom of the cell, and is removed through a suitable outlet tap.

Example 2.—Aluminum

Aluminum scraps are melted in the fused electrolyte of about 50 percent sodium chloride, 30 percent sodium carbonate and 20 percent sodium hydroxide of a cell essentially similar to that of Example 1, to form the theoretical and temporary alloy of the aluminum with the metallic form of sodium. The cell operates at about 850–950° C., 5–12 volts and 8,000–30,000 amperes.

The alloy is then leached with water to form sodium aluminate, from which the pure alumina is produced after filtration. The sodium aluminate solution is then diluted with water to 15 degrees Bé., and filtered. The filtrate containing the dilute solution of sodium aluminate is subjected to a series of thickeners in order to settle and precipitate the impurities which consist of silica, titanium, iron oxide, and double aluminates and silicates, and further filtered through a rotary vacuum type filter. The filtrate now freed from the impurities, is seeded with small amount of aluminum to accelerate the development of aluminum hydrate, $Al(OH)_3$, crystals. This filtrate with the aluminum hydrate, is placed into a cylinder tank (constructed to withstand pressure of about 500 lbs. per sq. in.) under 150–200 lbs. per sq. in. pressure; and the aluminum hydrate liquor is withdrawn through a nozzle having a nipple of multiple perforations to produce a jet-spray, into a vat with mutiple cover, the later with multiple perforations also to allow air in and water out without waste of the aluminum hydrate in solution. In about 18 to 24 hours, aluminum hydrate, $Al(OH)_3$, crystallizes out of the sodium aluminate-aluminum hydrate solution, leaving the diluted caustic mother liquor. The crystalline aluminum hydrate is filtered out from the mother liquor, washed with water, and filtered again. The aluminum hydrate is then sent to rotary dryers where it is calcined at red-heat to free the material from water, hence, it is converted into aluminum oxide, $Al_2O_3$. The calcined alumina of very high purity is now ready for feeding and charging into the refining electrolytic furnace.

The dilute caustic-soda solution (with the washings of aluminum hydrate crystals) is sent to vacuum evaporators where it is concentrated and dried, and may be used as an electrolyte, or another marketable product of the industry.

In the second step the purified alumina is charged to a fused electrolyte comprising about 16–17 percent by weight potassium fluoride, 33 percent sodium fluoride, 25 percent aluminum fluoride, 16–17 percent calcium fluoride, and 8 percent barium fluoride, together, fused at about 900° C.

The cell pot refining furnace is similar to that of Example 1, but its operating temperature is from 850 to 1000° C. Voltage across the cell is from 5.5 to 36 adjustable. Amperage of the cell is about 7,500 to 40,000, also adjustable.

The raw material filler is purified $Al_2O_3$ at about 5–10 percent concentration in the fused electrolyte. For every pound of purified metal, about 2–2.2 pounds of the raw material are needed. The prepared bath is charged into the cell pot electrolytic furnace and melted down by nearly shortcircuiting the potentials. When the cell is about four-fifths filled with the molten bath, alumina is introduced on top through a mechanical device, and the electrodes are raised to the operating position. At this instance, the voltage drops about 6 to 7 volts. As the alumina is being added from time to time to the molten electrolyte, the raw material dissolved in the molten bath is only about 5 percent. By charging the bath with about 10 percent of the total volume, the bath can always have enough supply of the raw material, however, the undissolved alumina, floats on top of the molten electrolyte. This requires a stirring device to constantly stir the bath and the filler. When there is enough molten aluminum at the bottom of the cell pot, it is withdrawn at the bottom through an appropriate outlet fitted with a stop-cock valve to ingot molders.

Example 3.—Titanium

Titanium scraps and ores are melted together at about 1800° C. into a fused electrolyte comprising 50 percent sodium chloride, 30 percent sodium peroxide, and 20 percent sodium hydroxide to form the theoretical and temporary alloy of the titanium metal with the metallic form of sodium, as thus:

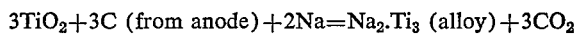

from which, titanium compound of soda, as sodium titanate, $Na_2Ti_3O_7$, is formed when the sodium-titanium alloy is washed with water in the "washing" vat. The sodium titanate crystals in the washing vat are further diluted with water until the hydrometer reading is at 10 degrees Bé., then after filtration are transferred to transparent titrating units. In the titrating vessels it is titrated with 25 percent hydrochloric acid to precipitate the titanium hydroxide, $Ti(OH)_4$, as thus:

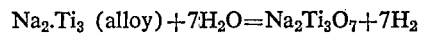

The clear liquid containing sodium chloride is withdrawn from the titrating vessel and sent to vacuum evaporators placed over the hot cell, where hot air passing through the exterior sides of the cell is also utilized to dry the sodium chloride crystals. The titanium hydroxide is withdrawn at the bottom of the titrating unit through an appropriate outlet fitted with a stop-cock valve at the conical end of the bottom of the titrating tank made of acrylic plastic. The $Ti(OH)_4$ is then dehydrated to produce the $TiO_2$ of high degree of purity. The material is now ready to be charged to the refining cell.

The electrolyte in the refining cell consists of about 24 percent by weight potassium fluoride, 36 percent sodium fluoride, 24 percent titanium potassium fluoride, $TiK_2F_6$ and 16 percent calcium fluoride, all fused together. Into the molten electrolytic bath at about 1800° C., the titanium oxide is charged by a mechanical device on top of the fused electrolyte, as the cell pot electrolytic furnace is vacuum run. The cell is operated at about 36 volts and 16,000 amperes. A yield of about 1 kilogram titanium is obtained from each 1.2 kilograms of titanium oxide.

The cell pot is made of titanium-ferro-tungsten steel alloy, and its dimensions are such that it would fit into the cell used for extracting and processing aluminum. The metallic box is constructed for vacuum operation. It is provided with another metal box on top fitted with a reverse pump to effect the vacuum condition of the cell when titanium oxide is reduced to its metallic state. Its anode is graphite placed into a perforated metal casing made of nickel-chromium-tungsten alloy steel. Outside of the cell pot electrolytic furnace box is a jacket of steel pipes filled with running cool water; and, it is fitted with an appropriate outlet that fits to the outlet of the outer shell which is constructed like the cell pot electrolytic furnace used for aluminum processing. The cell is fitted with a device which feeds the titanium dioxide into the molten electrolytic bath in a complete absence of atmospheric air.

I claim:

1. A method of extracting metal from a metal source, such as metal plating, scrap or ore including metals from the group consisting of tin, zinc, lead, aluminum, and titanium which comprises charging the metal source into a fused electrolytic cell containing a molten electrolyte comprising about 25–75 percent sodium chloride and 75–25 percent sodium carbonate, sodium peroxide, of sodium hydroxide, operating said electrolytic cell at about 5–36 volts and about 6,000–40,000 amperes, extracting the metal from said metal source acting as anode in said cell in the form of an intermediate molten alloy with sodium, removing said molten alloy from the cell to a second chamber containing water and reacting said alloy with said water to form a complex compound in solution of the metal and sodium, removing said solution to a further chamber and neutralizing the solution with acid to form the metal hydroxide and a sodium salt whereby said metal hydroxide settles to the bottom of the chamber as a precipitate and removing said metal hydroxide from said chamber and calcining said hydroxide to form a substantially pure metal oxide, said extraction step being performed in said molten electrolyte at a temperature of about 850–2000° C.

2. The method of claim 1 wherein said metal is selected from the group consisting of tin, zinc and lead, said extraction step is performed in said molten electrolyte at a temperature of about 850–950° C., said molten electrolyte comprises about 25–75 percent sodium chloride and 25–75 percent sodium carbonate, and said electrolytic cell is operated at about 5.5–36 volts and about 6,000–40,000 amperes.

3. The method of claim 2 wherein said metal source comprises tin cans or scrap tin plate, alone or in combination, and said electrolytic cell is operated at about 24–36 volts and about 6,000–8,000 amperes.

4. The method of claim 1 wherein said metal is aluminum, said extraction step is performed at a temperature of about 850–950° C., said molten electrolyte comprises about 25–75 percent sodium chloride, 25–75 percent sodium carbonate, and 0–30 percent sodium hydroxide, and said electrolytic cell is operated at about 5–12 volts and 8,000–30,000 amperes.

5. The method of claim 1, wherein said metal is titanium, said extraction step is performed at a temperature of about 1600–2000° C., said molten electrolyte comprises about 40–60 percent sodium chloride, 20–40 percent sodium peroxide and 10–30 percent sodium hydroxide, and said electrolytic cell is operated at about 24–36 volts and about 8,000–16,000 amperes.

References Cited
UNITED STATES PATENTS

| | | | |
|---|---|---|---|
| 400,667 | 4/1889 | Hall | 204—67 |
| 2,643,935 | 6/1953 | Halversen | 423—627 X |
| 771,646 | 10/1904 | Von Kugelgen et al. | 204—64 R |
| 885,761 | 4/1908 | Kern | 204—71 X |
| 1,628,050 | 5/1927 | Kraus et al. | 204—71 X |
| 2,742,418 | 4/1956 | Padgitt | 204—247 |
| 2,958,582 | 11/1960 | Hervert et al. | 23—143 |
| 3,071,436 | 1/1963 | Hervert et al. | 23—143 |
| 3,087,873 | 4/1963 | Slatin | 204—71 |
| 3,323,910 | 6/1967 | Schunemann | 204—71 X |
| 3,464,900 | 9/1969 | Foley et al. | 204—67 |
| 3,502,553 | 3/1970 | Gruber | 204—67 |
| 2,451,491 | 10/1948 | Johnson | 204—67 |

FOREIGN PATENTS

| | | | |
|---|---|---|---|
| 619,816 | 5/1961 | Canada | 204—64 R |

FREDERICK C. EDMUNDSON, Primary Examiner

U.S. Cl. X.R.

204—61, 64 T, 66, 67; 423—618, 619, 622, 626